United States Patent [19]

Nitta et al.

[11] Patent Number: 5,751,887
[45] Date of Patent: May 12, 1998

[54] APPARATUS AND METHOD OF DECODING DATA GROUPS OF PICTURES

[75] Inventors: Hajime Nitta, Kanagawa; Kiyoshi Ota, Tokyo, both of Japan

[73] Assignee: Sony Corporation, Tokyo, Japan

[21] Appl. No.: 598,727

[22] Filed: Feb. 8, 1996

[30] Foreign Application Priority Data

Feb. 17, 1995 [JP] Japan .................................. 7-051991

[51] Int. Cl.⁶ .................................................. H04N 5/783
[52] U.S. Cl. ........................................... 386/68; 386/111
[58] Field of Search ................................. 386/111, 109, 386/112, 125, 68, 82, 91, 46; 369/60, 50; H04N 5/76, 5/783

[56] References Cited

U.S. PATENT DOCUMENTS

| | | | |
|---|---|---|---|
| 4,956,820 | 9/1990 | Hashimoto | 365/222 |
| 5,204,787 | 4/1993 | Suzuki et al. | 386/91 |
| 5,471,450 | 11/1995 | Yonemitsu et al. | 369/60 |
| 5,523,799 | 6/1996 | Hattori et al. | 386/94 |

*Primary Examiner*—Thai Tran
*Assistant Examiner*—Huy Nguyen
*Attorney, Agent, or Firm*—Frommer Lawrence & Haug LLP; William S. Frommer

[57] ABSTRACT

Data decoding decodes data reproduced from a record medium and stored in a memory. Since decoding requires a sufficient amount of data to be stored in memory especially when the data is, for example, predictively encoded, a system controller is provided which inhibits previously read data from being overwritten in memory. Thus, when a reverse reproduction operation is suddenly initiated during a forward reproduction operation, a sufficient amount of data is reserved in the memory for decoding the data in the reverse direction. Similarly, the system controller inhibits the memory from writing over previously read data during a reverse reproduction and a sufficient amount of data is reserved for decoding when forward reproduction is resumed.

11 Claims, 5 Drawing Sheets

F I G. 2
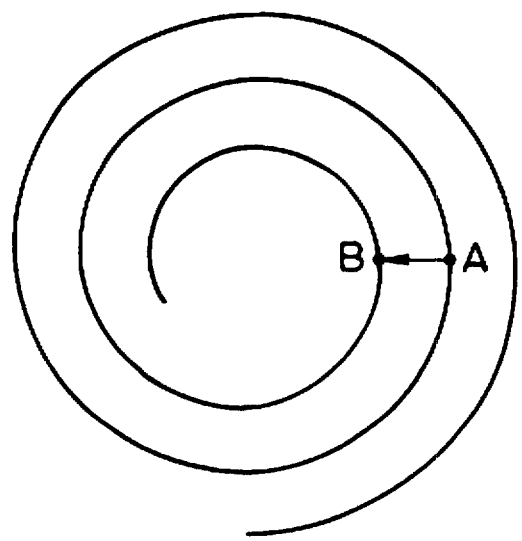

APPARATUS AND METHOD OF DECODING DATA GROUPS OF PICTURES

BACKGROUND OF THE INVENTION

The present invention relates to decoding data reproduced from a record medium in which moving image data is recorded in the form of digital data and, more particularly, to decoding data reproduced from the record medium in a reverse reproduction mode.

FIG. 1A shows data decoding apparatus which reproduces digital data from an optical disk 1 into video and audio signals. The digital data is stored on the optical disk in a format conforming to the MPEG (moving pictures experts group) standard. According to that standard, a series of frames making up a moving picture are processed as a group of pictures called a GOP (FIG. 1B). The frames are grouped in order to perform predictive encoding, i.e., predicting values for corresponding pixels in different frames and subtracting the prediction value from a target frame, thereby compressing the picture data.

More specifically, the MPEG technique includes three types of predictively encoded picture frames: an intra-frame coded picture (I), which is not predictively encoded and is usually the first or last picture frame in a group of pictures; a bidirectionally predictive coded picture (B), which is encoded using one preceding and one following frame, i.e., forward and backward prediction; and, a forward predictive coded picture (P), which is encoded using a preceding frame, i.e., forward prediction. That is, each B-frame requires two additional frames and each P-frame requires one additional frame for decoding and, as a result, the total number of frames required for decoding becomes multiplied. Therefore, a sufficient number of frames in each group are required to be read into a ring buffer memory 7 in order to decode the predictively encoded frames.

While the foregoing satisfactorily decodes the predictively encoded frames in a forward direction, it does not provide a sufficient amount of picture frames in the reverse direction. This technique reproduces the frames using an optical pickup 2. The reproduced frames are then demodulated by a demodulator 3 to remove the carrier signal from the frame signals. A sector detector 4 detects sector addresses recorded at each sector of the optical disk and couples them to a ring buffer controller 6. The frame data is passed through the sector detector 4 to a succeeding ECC circuit 5 (error checking and correcting circuit) which error-checks the data supplied from the sector detector (by using, for example, parity error detection) and error-corrects the frame data by use of redundant bits recorded on the optical disk. The error-corrected frame data is supplied to the ring buffer memory 7 and a track jump judgment circuit 18 causes the tracking servo circuit 17 to signal the pickup to advance to the next sector (to retrieve more picture frames). In this manner, frame data is stored in groups of pictures (GOP1, GOP2, GOP3 ... GOPn) in the ring buffer memory 7 as shown in FIG. 1B.

The sector detector 4 also outputs a sector number abnormality signal (either directly or through the ring buffer controller 6) to the track jump judgment circuit 18 when the sector address data cannot be detected or there is discontinuity between detected sector addresses. When this occurs, the track jump judgment circuit 18 judges that the pickup 2 must jump to a different sector to maintain continuity of the frame data retrieved from the last sector. Accordingly, the tracking servo circuit 17 receives the appropriate command signal from the track jump judgment circuit 18 and causes the pickup 2 to jump the appropriate number of sectors to the correct sector.

The ECC circuit 5 error-corrects the frame data and supplies the same to the ring buffer memory 7. However, should the ECC circuit 5 be unable to error correct the data, the ECC circuit 5 sends a signal (either directly or through the ring buffer controller 6) to the track jump judgment circuit 18 commanding the tracking servo circuit 17 to jump the pickup 2 from sector A to the previous sector B, for example (FIG. 2). Thus, the frame data is re-read by the pickup 2 and the ECC circuit 5 has another chance at error-correcting the frame data.

The ring buffer memory 7 is a buffer (such as, for example, a FIFO (first-in-first-out) memory) and should be adequately filled, but not overflown, for efficient use of the buffer. Moreover, a sufficient number of picture frames should be stored in the ring buffer memory 7 in order to adequately decode the predictively encoded picture frames since the frames were encoded by reference to other frames. The ring buffer memory is filled with frame data in the manner discussed above. As the ring buffer memory 7 becomes full, the ring buffer controller 6 inhibits the flow of frame data by sending a signal to the track jump judgment circuit 18 commanding the tracking servo circuit 17 to jump the pickup 2 to a previous sector (FIG. 2). The video decoder 14 and the audio decoder 16 decode the frame data at a variable rate and, therefore, send code request signals (via buffers 13, 15, respectively, and the multiplexed data separator 8) to the ring buffer controller 6 to cause the frame data to be output at an appropriate rate. As frame data is reproduced (output) from the ring buffer memory, the ring buffer controller allows the pickup (via the track jump judgment circuit) to advance to the next sector and retrieve more data to be input to the ring buffer memory.

The ring buffer controller 6 regulates the flow of frame data input and output to the ring buffer memory 7 using a write pointer (WP) and a read pointer (RP). As shown in FIG. 1B, groups of pictures (GOP1, GOP2, GOP3) are presently stored in the ring buffer memory. As the picture frames in each group of pictures are read out from the ring buffer memory, the read pointer RP is advanced counter-clockwise along the picture frames. Meanwhile, the ring buffer controller determines that the ring buffer memory is not sufficiently filled and allows frame data to be written to the ring buffer memory as a group of pictures (GOPn), advancing the write pointer WP counter-clockwise as the frames are written. As can be seen from FIG. 1B, the system shown in FIG. 1A stores a sufficient amount of frames to decode the predictively encoded data in the forward direction.

The multiplex data separator 8 separates header information, indicating whether the data is video or audio data, from the frame data. A separator controller 11 controls a switch 10 according to the header information to switch the output between a video code buffer 13 and an audio code buffer 15, such that the video and audio data are sent to the appropriate decoders. The buffered data is then decoded by video or audio decoders 14, 16 and supplied to terminals 91, 92, respectively. Thus, the frames are successfully decoded in a forward direction.

When reverse playback is desired, however, the system shown in FIG. 1A is not able to efficiently decode predictively encoded data. As shown in FIG. 1B, new picture groups (GOPn) in ring buffer memory 7 have been written over previously read picture frames during forward playback. However, when the reverse mode is desired, the read pointer RP reverses direction and begins reading picture frames in a direction towards the write pointer WP. In the case where the write pointer WP has already written over (or

3 advanced past) a portion of the group of pictures to be reverse reproduced (as with the case of GOP1), there is not a sufficient amount of picture frames stored in the ring buffer memory to decode the predictively encoded data. As a result, reverse reproduction is not successful in the related art device.

SUMMARY OF THE INVENTION

The present invention provides a system controller to ensure that a sufficient amount of picture frame data in the ring buffer memory exists during a reverse reproduction. As data is read from the memory, new data is written into the areas in which the previously read data were stored. The system controller inhibits the writing of new data over the previously read data to preserve a sufficient amount of picture frame data in the memory for reverse reproduction. Thus, the present invention is advantageous in efficiently reproducing pictures of high quality in both the forward and reverse directions.

BRIEF DESCRIPTION OF THE DRAWINGS

A more complete appreciation of the present invention and many of its attended advantages will be readily obtained by reference to the following detailed description considered in connection with the accompanying drawings, in which:

FIG. 2 is a schematic diagram showing the manner in which the reproducing position of a pick up is jumped;

DETAILED DESCRIPTION OF THE PREFERRED EMBODIMENT

Figure 3:
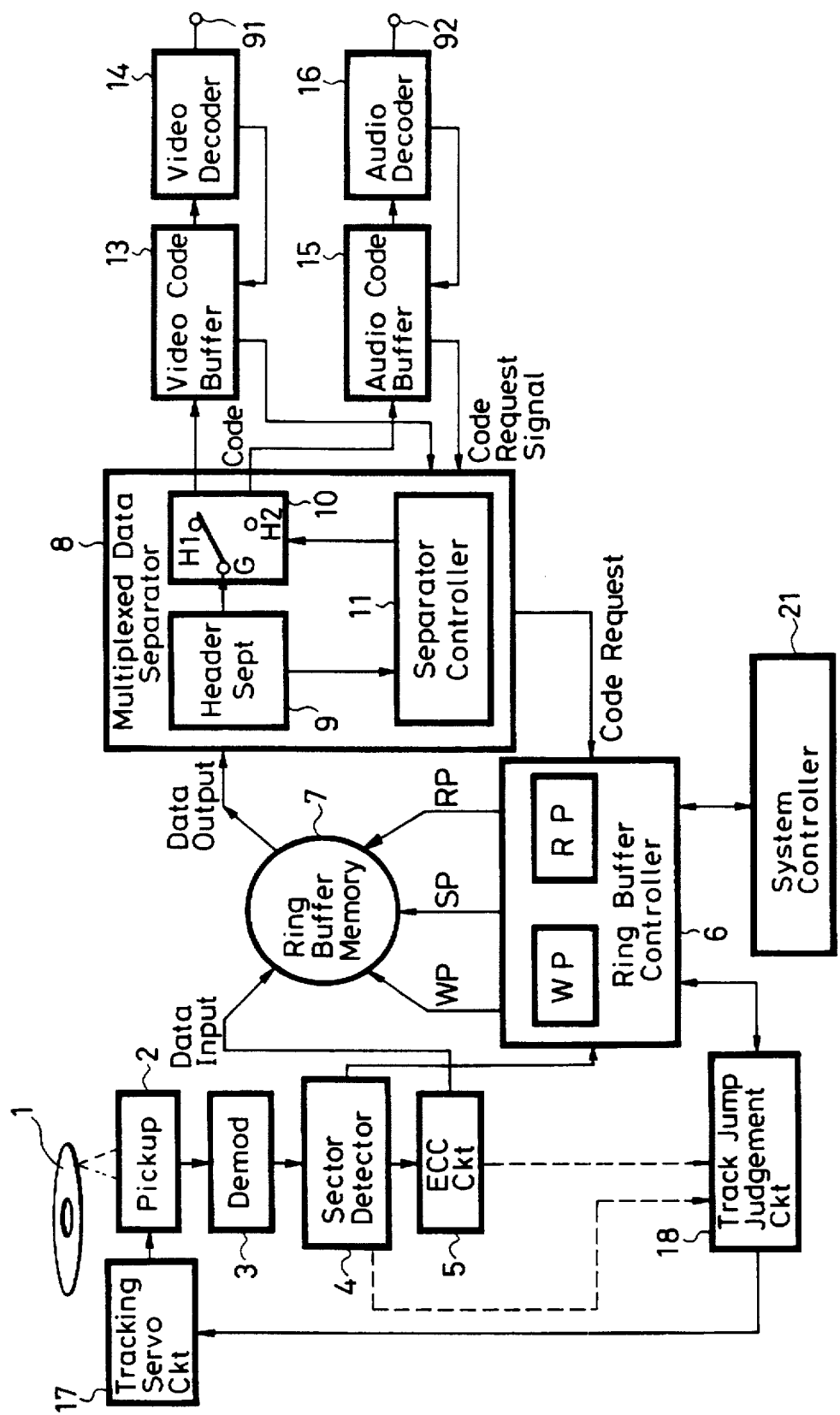
FIG. 3 is a block diagram showing a data decoding apparatus according to the present invention.

Referring now to the drawings, wherein like reference numerals designate identical or corresponding parts throughout the several views, the data decoding apparatus of the present invention will be described with reference to FIG. 3.

The present invention is applicable to any data decoding apparatus employing reverse reproduction, but is particularly advantageous to data decoding apparatus that reproduces predictively encoded picture frames. As discussed, predictively encoded picture frames according to the MPEG standard are compressed by subtracting data predicted to exist in a target picture frame by comparing the target picture data to data of other picture frames. Thus, a large number of encoded picture frames are needed for decoding.

The MPEG picture frames are reproduced from the optical disk 1 and stored as data in ring buffer memory 7 in groups of pictures (FIGS. 4A–4E). The ring buffer controller 6 controls data input and output to the ring buffer memory by inhibiting the data received by the pickup 2 and allowing data to be output upon a code request from the video and audio decoders 14, 16. The ring buffer controller causes the pickup (via the track jump judgment circuit 18 and the track servo circuit 17) to jump to an appropriate sector as dictated by the sector detector 4 and the ECC circuit 5. The multiplex data separator 8 extracts a header from the data to determine

4 whether the data is video or audio data and controls a switch 10 to output the data to a video or audio code buffer 13, 15, appropriately. The buffered data is output to the video and audio decoders 14, 16 at a rate set by the decoders and the predictively encoded data is decoded.

The present invention provides a system controller 21 that regulates the operation of the ring buffer controller 6. As data is output (read) from the ring buffer memory 7, the ring buffer controller allows data to be input (written) over the previously read data in the ring buffer memory. The system controller 21 determines how far the data input to the ring buffer memory may overwrite previously read data to ensure that a sufficient amount of frame data exists to successfully execute decoding in the reverse direction.

Figure 4A:
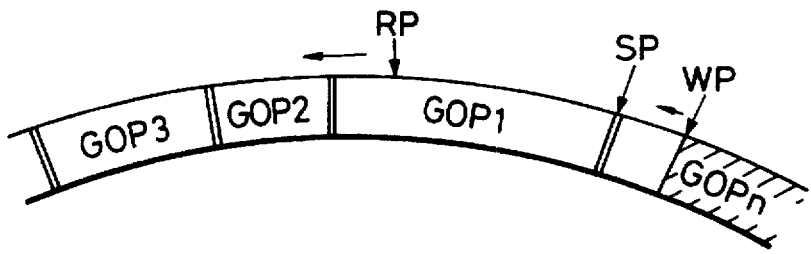
FIGS. 4A through 4E are useful in showing the manner in which write and read pointers are operated according to the present invention.

As an example of the operation of the present invention, reference is now made to FIGS. 4A–4E. During forward reproduction, the ring buffer controller fills the ring buffer memory with data in groups of pictures (GOP1, GOP2 and GOP3) as shown in FIG. 4A. The ring buffer controller keeps track of the position of the last-recorded frame using a write-pointer WP, which advances as each frame of data is written into the ring buffer memory. Since a ring buffer memory is logically configured as a continuous loop, such that the beginning of the buffer is connected to the end of the buffer, the write pointer WP advances to the beginning of the buffer after data is written into the last physical address of the buffer. FIG. 4A depicts the situation where the buffer is almost full and the write pointer WP indicates that new data (GOPn) is about to overwrite the first group of pictures GOP1.

Meanwhile, the video and audio decoders 14, 16 send code request signals to the ring buffer controller 6 requesting that data be output (read) from the ring buffer memory 7. As the data is output, the ring buffer controller advances the read pointer RP along the group of pictures as shown in FIG. 4A so that the previously read data can be overwritten.

Figure 1A:
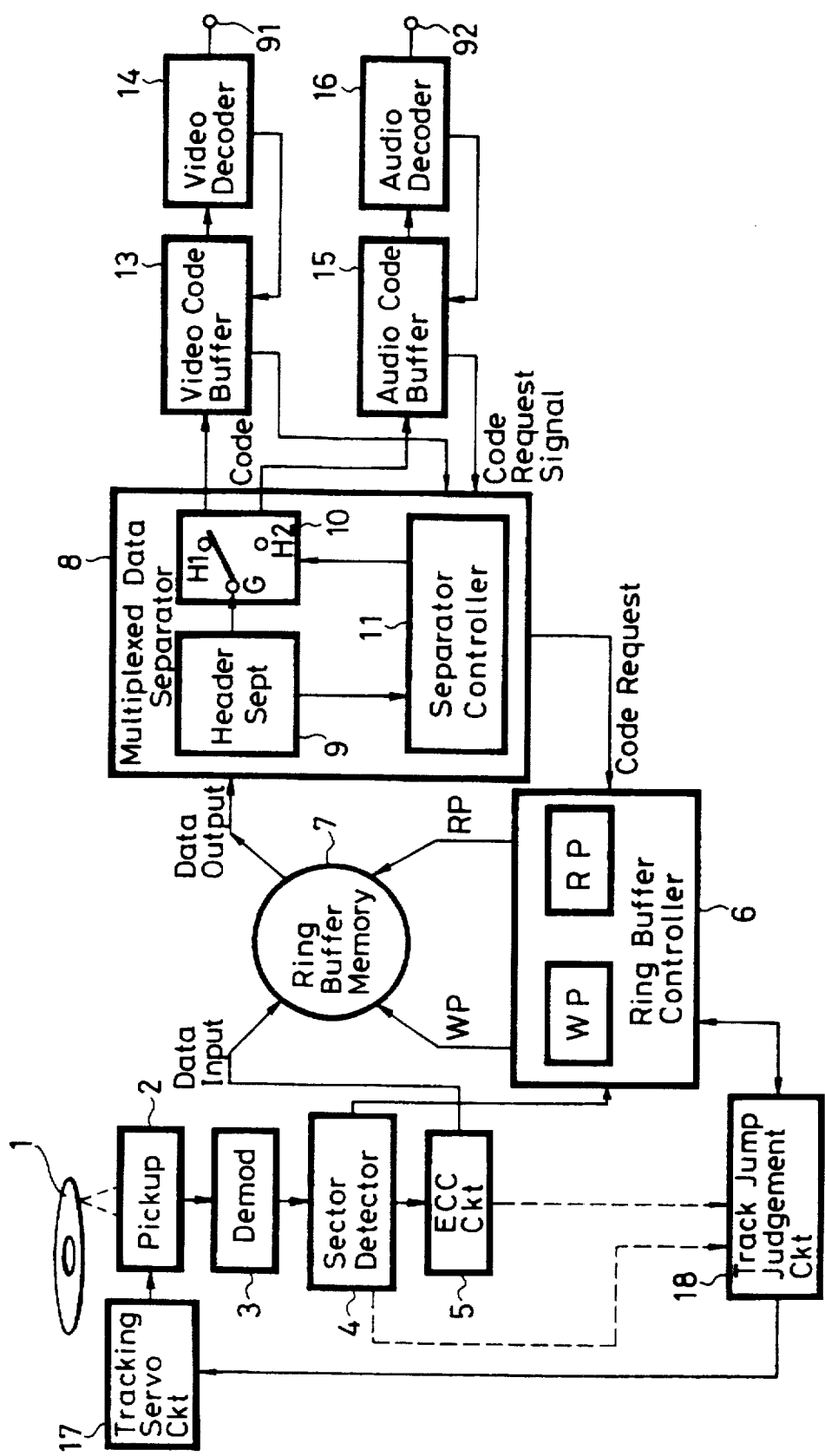
FIG. 1A is a block diagram showing a data decoding device.
Figure 1B:
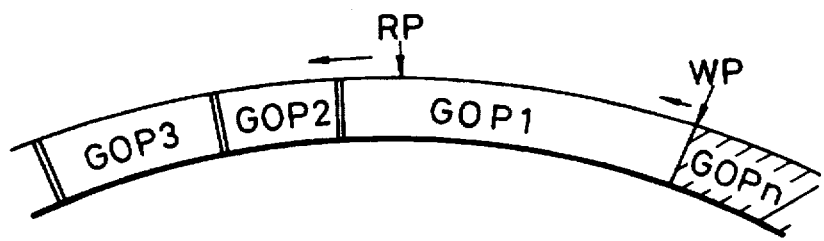
FIG. 1B is a conceptual diagram of the ring buffer memory describing how write and read pointers are employed.

It will be recalled that in FIG. 1A, the ring buffer controller 6 was allowed to continuously write the new group of pictures GOPn over the previously read pictures of GOP1. This was problematic because the first group of pictures GOP1 was still being read out from the ring buffer memory (as indicated by the read pointer RP). During a reverse reproduction at this point, the GOP1 pictures were read in a clockwise direction (i.e., opposite to the direction shown by the read pointer RP) and a sufficient amount of picture frames were not available because the ring buffer controller 6 had been allowed to write over a portion of the first group of pictures GOP1.

The system controller 21 of the present invention maintains a sufficient amount of picture frames in the ring buffer memory during a forward reproduction mode in the event that reverse reproduction should suddenly be desired. In the preferred embodiment, a write-inhibit pointer SP is assigned by the system controller to the leading edge of the group of pictures currently being read (i.e., GOP1, FIG. 4A). The write-inhibit pointer SP indicates to the ring buffer controller that writing should not be advanced past the address corresponding to the write-inhibit pointer SP. Should reverse reproduction be initiated while a group of pictures GOP1 is being read in the forward direction, the previously read portion of GOP1 is preserved in the ring buffer memory and a sufficient amount of picture data is available.

Figure 4B:
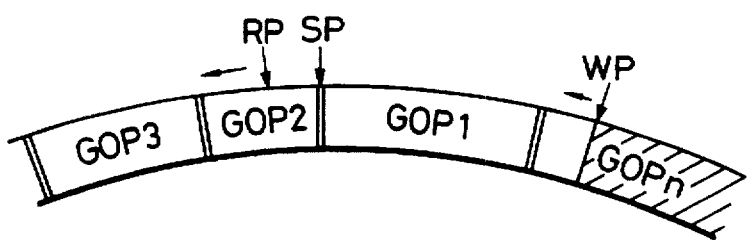
Figure 4C:
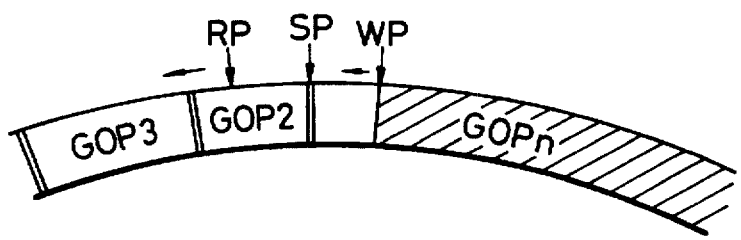

To continue with reproduction in the forward mode, the system controller 21 advances the write-inhibit pointer SP to the leading edge of the next group of pictures GOP2 as shown in FIG. 4B when the first group of pictures GOP1 have been completely read. At this time, the ring buffer controller proceeds to write the new group of pictures GOPn over the first group of pictures GOP1 as shown in FIG. 4C. As before, the write-inhibit pointer SP prevents the ring buffer controller from advancing a writing operation over the group of pictures currently being read (GOP2) and a sufficient amount of picture frames are reserved in the buffer for reverse reproduction.

In the preferred embodiment, the write-inhibit pointer SP advances to the beginning of each group of pictures, thus maintaining the entire group of pictures in memory for reverse reproduction. However, the write-inhibit pointer SP may be positioned anywhere so long as there is a sufficient amount of data in memory to reproduce the picture frames in a reverse reproduction mode. This provides the invention with the flexibility to minimize the amount of memory required for storing previously read data.

Figure 4D:
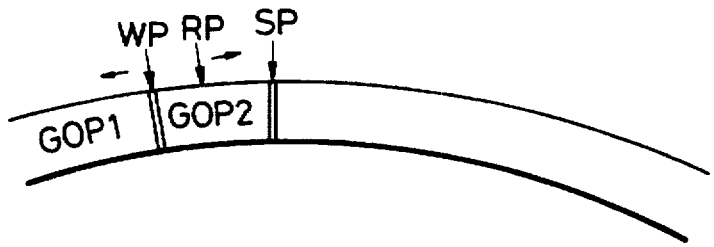

When a reverse reproduction mode is suddenly initiated after forward reproduction, the ring buffer controller 6 causes data to be read out of the ring buffer memory 7 in a reverse direction (as indicated by the clockwise direction of the read pointer RP in FIG. 4D). At this time, the write pointer WP is repositioned by the system controller 21 to the end of the second group of pictures GOP2. The ring buffer controller then executes reproduction of the picture frames from the optical disc in a reverse direction, thus writing the groups of pictures into the ring buffer memory in a descending order.

Figure 4E:
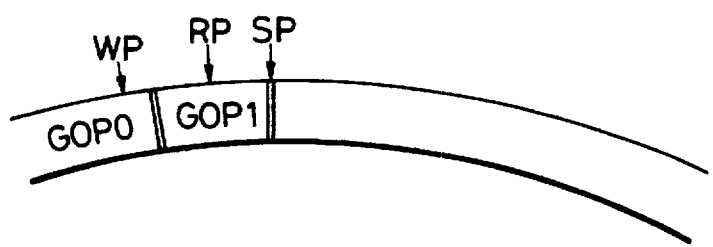

When the second group of pictures GOP2 is finished being read out from the ring buffer memory 7 in the reverse direction (FIG. 4D), the read pointer RP will be advanced to the end of the first group of pictures GOP1 and the write-inhibit pointer SP is repositioned at the beginning of the next group of pictures (i.e., GOP1, FIG. 4E). Writing in the reverse direction into the ring buffer memory will continue to fill the ring buffer memory until the write pointer comes full circle to the write-inhibit pointer SP as shown in FIG. 4C. As in the forward direction, the write-inhibit pointer SP will be advanced only after the last group of pictures is completely read out of the ring buffer memory. Thus, the write-inhibit pointer also serves to ensure that the picture frames of the currently read group of pictures are not overwritten by a reverse-mode writing operation.

When reverse reproduction has ended and forward reproduction is re-initiated, the read pointer RP reverses direction and again advances in the clockwise direction. Since the write-inhibit pointer inhibited the previously read frames from being overwritten in reverse reproduction, there is a sufficient number of frames for reproduction when forward reproduction is resumed. At this time, the write pointer WP is repositioned at the beginning of the group of pictures GOP0 and a writing operation overwrites GOP0 with the next group of pictures. Thus, reading resumes in the forward direction smoothly and without pause.

With the arrangement described by the present invention, a sufficient amount of picture frames, especially for the purposes of decoding MPEG pictures, is maintained in the ring buffer memory for both a forward and reverse reproduction mode. While the present invention is most advantageously employed for decoding MPEG picture frames, the invention may also be applied to any decoding apparatus employing reverse reproduction. The present invention also is not limited to reproducing data from optical discs, but, of course, is applicable to reproducing data from other types of record media. Therefore, numerous modifications and variations of the present invention are contemplated and it is to be understood that, within the scope of the appended claims, the invention may be practiced otherwise as specifically described herein.

We claim:

1. An apparatus for decoding groups of pictures conforming to the MPEG standard reproduced from a record medium comprising:

memory means logically configured in a continuous loop for storing said groups of pictures reproduced from the record medium;

first control means for causing said data reproduced from the record medium to be written into and read from said memory means, wherein, said first control means, during forward reproduction, causes frames of each group of pictures to be read around said continuous loop of said memory means;

decoding means for decoding data read from said memory means; and second control means for inhibiting, during forward reproduction, the first control means from overwriting a respective group of pictures being currently read from said memory means until all frames of said respective group of pictures are read from said memory means, such that all of said frames in said respective group of pictures being currently read are available in said memory means when reverse reproduction is initiated.

2. The apparatus for decoding data according to claim 1 wherein the second control means comprises:

write-inhibit pointer means for storing a memory address demarking the beginning of said respective group of pictures currently being read from the memory means, such that the second control means inhibits said first control means from writing said new groups of pictures around said continuous loop beyond the memory address indicated by the write-inhibit pointer means.

3. The apparatus for decoding data of claim 2, wherein the first control means comprises:

read pointer means for incrementing a memory address of a frame of said respective group of pictures currently being read from the memory means; and write pointer means for incrementing a memory address of a frame of a new group of pictures reproduced from said record medium currently being written over frames of said groups of pictures previously read from said memory means.

4. The apparatus for decoding data of claim 3, wherein the memory means is a ring buffer memory.

5. A method for decoding MPEG predictively-encoded picture-frame data recorded on a record medium from groups of pictures comprising the steps of:

reproducing the picture-frame data from said record medium;

writing said picture-frame data as new groups of pictures reproduced from said record medium in a memory logically configured in a continuous loop;

reading, during forward reproduction, a respective group of pictures from said memory in response to a request from a decoder;

decoding said respective group of pictures read from said memory; and inhibiting, during said forward reproduction, the memory from writing over said respective group of pictures currently being read from said memory until all frames of said respective group of pictures are read from said memory, such that all of said frames in said respective group of pictures being currently read are available in said memory when reverse reproduction is initiated.

6. The method for decoding according to claim 5, further comprising the steps of:

incrementing a read pointer to an address in said memory pointing to said respective group of pictures currently being read from said memory in forward reproduction; and incrementing a write pointer pointing to an address in said memory where said new groups of pictures are to be written during said forward reproduction.

7. The method for decoding according to claim 6, wherein the step of inhibiting comprises advancing a write-inhibit pointer to an address in said memory pointing to a beginning of said respective group of pictures currently being read as picture-frame data from said memory in said forward reproduction; and preventing picture-frame data from overwriting the data of said respective group of pictures currently being read by inhibiting the write pointer from advancing beyond the write-inhibit pointer in said memory.

8. The method for decoding according to claim 7, further comprising the step of:

repositioning the write pointer to an end of the respective group of pictures currently being read from said memory as picture-frame data when a reverse reproduction is initiated, thereby allowing said new groups of pictures to be written in said memory immediately after said respective group of pictures.

9. The method for decoding according to claim 8, further comprising the step of:

positioning the read pointer to an address in said memory pointing to said respective group of pictures currently being read from said memory in said reverse reproduction.

10. The method for decoding according to claim 9, further comprising the step of reproducing from said record medium and writing to said memory, during said reverse reproduction, those groups of pictures preceding said respective group of pictures which were previously overwritten in said memory during forward reproduction.

11. The method for decoding according to claim 10, further comprising the step of inhibiting writing, during reverse reproduction, beyond the beginning of said respective group of pictures in said memory such that when reverse reproduction ends and forward reproduction is initiated, all of said frames of said respective group of pictures being read during reverse reproduction are available in said memory upon reinitiating forward reproduction.

* * * * *